July 15, 1941.    J. L. GILMORE    2,249,238
MECHANICAL CHAIN LINK
Filed Oct. 3, 1940
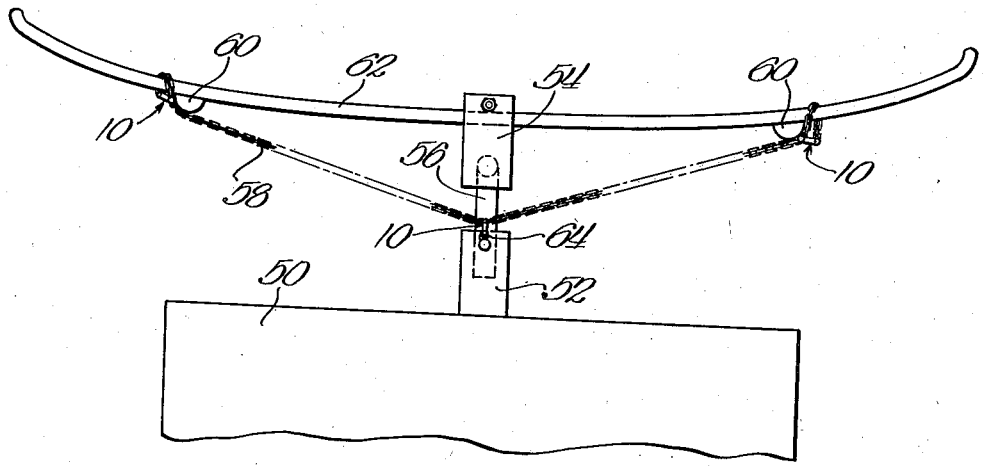
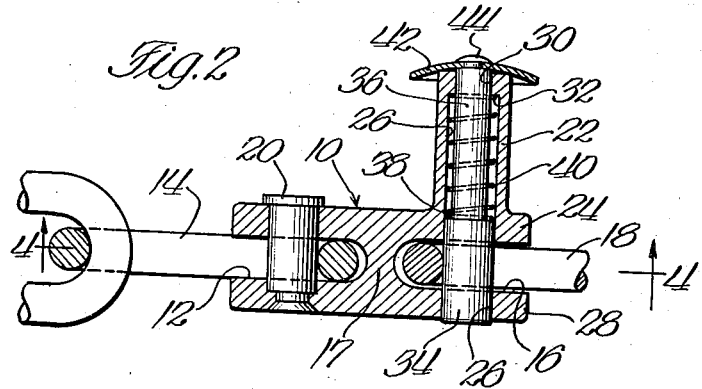  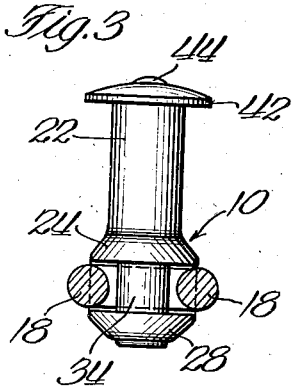
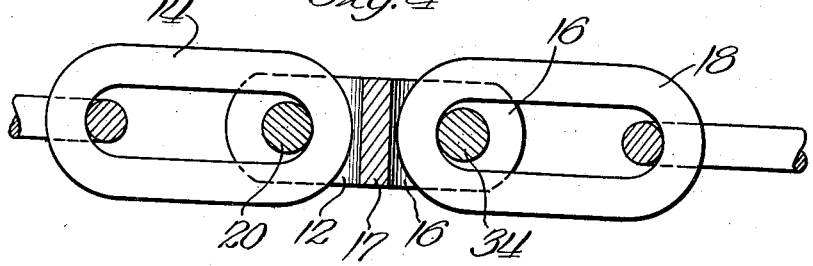
INVENTOR.
John L. Gilmore
BY Bair & Freeman
ATTORNEYS Patented July 15, 1941

2,249,238

UNITED STATES PATENT OFFICE 2,249,238

MECHANICAL CHAIN LINK

John L. Gilmore, Kansas City, Mo.

Application October 3, 1940, Serial No. 359,563

1 Claim. (Cl. 59—93)

My invention relates to mechanical links for chains of a sort which permit joining ends of chain together or which may be used for making a loop at the end of a chain.

Among the objects of my invention is to provide a new and improved mechanical link for a chain which has a permanent connection to one end of a chain and a slot permitting the link to be temporarily secured to another link and provided with a spring pressed plunger which can be quickly and easily manipulated so as to easily attach and detach the mechanical link from engaging position with the link of a chain.

Another object of my invention is to provide a new and improved mechanical link which has a permanent connection to the end of a chain and which is provided with a slot for reception of a chain link at the other end and a spring pressed plunger for securing the link temporarily to the body.

Another object of my invention is to provide a new and improved mechanical link for a chain which has substantially the same size as one of the links in the chain with which it operates and which works as a link in the chain when once it is secured in place.

Still another object is to provide a new and improved mechanical link for a chain slotted at both ends in relatively the same direction for the reception of links of the chain which are to be joined and provided with a spring pressed shaft normally urged to a position for retaining one of the links in place and which is provided with a hand hold or knob designed to be grasped for withdrawing the shaft when it is desired to separate the chain thus joined.

Still a further object is to provide a safety chain of the sort adapted for use in connecting trailers to a vehicle wherein a plurality of free ends of a chain each provided with a mechanical link of the type just referred to can be attached to portions of the vehicle by looping it around those portions and then fastening the chain upon itself by means of the mechanical link.

With these and other objects in view, my invention consists in the construction, arrangement and combination of the various parts of my device whereby the objects contemplated are attained, as hereinafter more fully set forth, pointed out in my claim and illustrated in the accompanying drawing, in which:

Figure 1 is a plan view showing the mechanical link in service on a chain for securing a trailer to the bumper of a vehicle which draws it.

Figure 2 is a vertical section of the mechanical link showing chain links secured thereto, on a larger scale.

Figure 3 is an end elevational view of the mechanical link.

Figure 4 is a horizontal sectional view taken on the line 4—4 of Figure 2.

While it has long been the practice to provide one means or another for attaching together links of a chain such means has heretofore been devoted primarily to securing the links together without providing for a free and unrestricted movement of the links so secured in order that the flexibility of the chain may be maintained.

Also, mechanical connections heretofore devised have been customarily of a permanent nature not capable of being easily attached or detached without the use of some tool.

On other occasions detachable links which have been devised have been of a type which although sometimes clipping easily into place have not been provided with a secure locking mechanism so that on frequent occasions they become inadvertently loosened and detached particularly when there is a slack in the chain to which they are applied.

In my device I have provided what amounts to an additional link for the chain which has practically the same freedom of movement as any of the links normally in the chain, the same strength, but one which by merely withdrawing a plunger or shaft can be detached or attached to a chain.

In my device there is provided a body 10 which houses the parts of the device and which is provided at one end with a slot 12 for reception of a link 14 of the chain and at the other end a slot 16 for reception of a ling 18 of the chain separated from the slot 12 by a partition 17. The slot 12 has a width slightly greater than the gauge of the chain link 14 and a convenient depth which receives only a portion of the overall length of the chain link.

A rivet 20 is driven through the side walls of the slot and through the open center of the link, thereby anchoring the chain link in the body of the mechanical link. At the other end of the body 10 the slot 16 is likewise provided with a width slightly greater than the gauge of the chain link 18 and of a similarly suitable depth.

A projection 22 is provided on the body opposite one wall 24 of the slot 16 which may be of a substantially cylindrical shape and extending outwardly a distance from the body. Within the projection is an aperture or a passage 26 which extends likewise through the opposite wall 28 of the slot 16. A smaller passage 30 connects the larger passage 26 with the exterior and provides a shoulder 32 within the projection.

Positioned in the passage is a plunger 34 which has a diameter at the lower end substantially the same as the diameter of the passage 26 providing a free sliding fit and which has likewise at its upper end a portion 36 having a diameter substantially the same as the passage 30 providing a sliding fit therein. By having a plunger or shaft of two different diameters as described, there is provided a shoulder 38 between them.

Likewise within the passage 26 and surrounding the small end of the shaft is a coiled spring 40 which bears at one end against the shoulder 38 and at the other end against the shoulder 32.

At the top end of the plunger as viewed in Figure 2 there is provided a knob or disc 42 riveted to the shaft by means of the rivet 44 and providing a hand hold for manipulating the plunger. The knob likewise in the normal position shown in Figure 2 serves as a stop or limiting means which prevents the spring from pushing the shaft out of the passage 26.

When the device is assembled the spring is first placed over the upper end of the shaft which is then inserted into the passage 26 until the upper end of the plunger protrudes through the passage 30 and at this point the knob is riveted thereto.

In operation the mechanical link is permanently attached at one end to a link 14 of the chain by means of the rivet 20 permitting the link to move freely within the slot 12. The other slot 16 is normally empty and the shaft 34 normally extended downwardly in the position shown in Figures 2 and 3.

In order to attach the mechanical link to a chain the operator grasps the knob 42 and withdraws the shaft 34 against the tension of the spring 40, thereby clearing the slot 16 of any obstruction. When this is done the end link of an adjacent chain or in fact the mid portion of any link in the chain can be inserted into the slot 16, whereupon the shaft is released and is extended downwardly by the spring 40 into the lower portion of the passage 26 in which position it forms an anchor or a retaining device for the chain link inserted in the slot.

A particularly useful adaptation of the device is shown in Figure 1, where it is attached to a chain for anchoring a trailer 50 to a vehicle which draws it. The trailer is provided with a tongue 52 and the vehicle with a draw bar 54, to each of which are attached portions of a suitable trailer coupling 56 which normally forms the primary coupling for securing the trailer to the vehicle.

A chain 58 is used primarily as a safety device or auxiliary. This chain is provided at each end with one of the mechanical links 10. Another link 10 is likewise positioned approximately midway between the ends. The free ends of the chain are shown in a position looped around projections 60 of a bumper or similar device 62 and then secured each to itself by means of the spring pressed shaft 34 at the other end of the mechanical link.

At the point midway between the ends the link may be permanently attached to the chain 58 and an auxiliary chain 64 comprising two or three links secured to the trailer tongue providing a means for detachably securing the middle mechanical link 10 to it.

By providing a chain of the type described it may be quickly and easily detached from the bumper and likewise quickly and easily detached from the trailer tongue itself and stored in the trailer when not in use.

It will be appreciated that the use of the link illustrated in connection with a vehicle trailer is only one of a great many uses to which this mechanical chain link might be put.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

A mechanical link for a chain comprising a body substantially equal in length to a link in said chain having a width and thickness less than the width of a link in said chain and having slots extending inwardly from each end separated by a wall having a thickness not greater than the thickness of a chain link, the slot at one end having a rivet extending from wall to wall and permanently secured thereto and a chain link permanently secured thereby in free moving engagement with the body, an elongated cylindrical projection smaller in diameter than the width of the body positioned at the other end integral with the body at one side thereof having a cylindrical passage transverse to the slot therein extending through both walls of said slot, a chain link in the slot, a passage of smaller diameter at the outside end of said projection, a longitudinally movable shaft having a diameter at one end substantially equal to the diameter of said first cylindrical passage and smaller than the aperture in the chain link, and having at the other end a diameter substantially equal to the diameter of the smaller passage forming a shoulder therebetween, a helical coiled spring around the smaller diameter abutting said shoulder at one end and the bottom of said first passage at the other end and a knob overlying said smaller passage and the circumference of said projection secured to the shaft outside said projection to cover and protect said last passage from infiltration of dirt and grease and to maintain the shaft in position against the expansive force of the spring whereby said shaft is normally urged to a locked position in the passage in both walls of the slot with the ends thereof substantially flush with the projection end and the outside wall of the body respectively for releasably holding the chain link in said second slot.

JOHN L. GILMORE.